(12) United States Patent
Al-Abed et al.

(10) Patent No.: US 11,701,642 B2
(45) Date of Patent: Jul. 18, 2023

(54) SYNTHESIS OF METALLIC MATERIALS IMBEDDED IN ACTIVATED CARBON TO DEGRADE CHLORINATED AND FLUORINATED ORGANIC POLLUTANTS

(71) Applicant: United States Government, as represented by the Administrator of the U.S. EPA, Washington, DC (US)

(72) Inventors: Souhail Al-Abed, Cincinnati, OH (US); John McKernan, Cincinnati, OH (US); Slawomir Lomnicki, Baton Rouge, LA (US)

(73) Assignee: United States Government, as represented by the Administrator of the U.S. EPA, Waashington DC, Washington, DC (US)

(*) Notice: Subject to any disclaimer, the term of this patent is extended or adjusted under 35 U.S.C. 154(b) by 433 days.

(21) Appl. No.: 16/793,538

(22) Filed: Feb. 18, 2020

(65) Prior Publication Data

US 2021/0252488 A1 Aug. 19, 2021

(51) Int. Cl.
| | | |
|---|---|---|
| *B01J 21/18* | (2006.01) | |
| *B01J 23/89* | (2006.01) | |
| *B01J 35/10* | (2006.01) | |
| *B01J 37/02* | (2006.01) | |
| *B01J 37/18* | (2006.01) | |
| *C02F 1/72* | (2023.01) | |
| *B01J 37/14* | (2006.01) | |
| *B09C 1/00* | (2006.01) | |
| *C02F 101/36* | (2006.01) | |
| *C02F 103/06* | (2006.01) | |
| *B09C 1/08* | (2006.01) | |

(52) U.S. Cl.
CPC .......... *B01J 23/8906* (2013.01); *B01J 21/18* (2013.01); *B01J 35/1061* (2013.01); *B01J 37/0203* (2013.01); *B01J 37/0213* (2013.01); *B01J 37/14* (2013.01); *B01J 37/18* (2013.01); *C02F 1/725* (2013.01); *B09C 1/002* (2013.01); *B09C 1/08* (2013.01); *C02F 2101/36* (2013.01); *C02F 2103/06* (2013.01)

(58) Field of Classification Search
None
See application file for complete search history.

(56) References Cited

U.S. PATENT DOCUMENTS

| | | | |
|---|---|---|---|
| 6,531,304 B1 * | 3/2003 | Bonnemann | H01F 1/44 435/173.9 |
| 9,409,162 B2 | 8/2016 | Bohringer et al. | |

FOREIGN PATENT DOCUMENTS

| | | | |
|---|---|---|---|
| CN | 106784889 | * | 5/2017 |
| WO | WO2013023715 A1 | | 2/2013 |
| WO | 2018150047 | * | 8/2018 |
| WO | WO2018150047 A1 | | 8/2018 |

* cited by examiner

*Primary Examiner* — Sheng H Davis
(74) *Attorney, Agent, or Firm* — Mark E. Bandy; Rankin Hill & Clark, LLP

(57) ABSTRACT

Catalyst materials comprising iron and palladium are described. Also described are methods for preparing such materials. In addition, methods for remediating materials such as sediments and groundwater using the catalyst materials are described.

10 Claims, 2 Drawing Sheets

SYNTHESIS OF METALLIC MATERIALS IMBEDDED IN ACTIVATED CARBON TO DEGRADE CHLORINATED AND FLUORINATED ORGANIC POLLUTANTS

FIELD

The present subject matter relates to remediation of sediments and groundwater from persistent halogenated contaminants. A new and innovative method of synthesis of catalyst is described for such remediation process. The method produces systems with interspersed Fe and Pd atoms in clusters distributed inside mesopores of granulated activated carbon matrix.

BACKGROUND

It is well known to treat contaminated liquids and particularly ground water by the use of activated carbon. Activated carbon materials have been used in "pump and treat" applications and also employed in treating contaminant vapors such as from contaminated soil and groundwater. Although satisfactory in many respects, a need exists for an improved material for removing contaminants and particularly chlorinated and fluorinated organic pollutants. In addition, a need exists for a process of producing such materials. And, a need exists for new strategies and techniques for using the materials to remove contaminants and/or pollutants.

SUMMARY

The difficulties and drawbacks associated with previous approaches are addressed in the present subject matter as follows.

In one aspect, the present subject matter provides a material for degrading organo halogen compounds (OHC's). The material comprises a carbonaceous matrix, and clusters of iron and palladium atoms distributed in the carbonaceous matrix.

In another aspect, the present subject matter provides a method for preparing a material for degrading organo halogen compounds (OHC's). The method comprises preparing an aqueous solution of oleic acid and iron ions, and preparing an aqueous solution of oleic acid and palladium ions. The method also comprises combining the aqueous solution having iron ions with the aqueous solution having palladium ions and forming nanosized micelles having lipophilic terminal surfaces. The method also comprises providing carbonaceous material having mesopores, and combining the micelles with the carbonaceous material to form a precursor material. The method additionally comprises heating the precursor material in the presence of air or oxygen to form precursor oxide material. And, the method further comprises reducing the precursor oxide material to form the material for degrading OHC's.

In yet another aspect, the present subject matter provides a method for removing halogenated contaminants from an environment. The method comprises providing a material including (i) a carbonaceous matrix defining mesopores distributed in the matrix, and (ii) clusters of iron and palladium atoms inside at least a portion of the mesopores. The method also comprises exposing the material to the environment containing halogenated contaminants. At least a portion of the halogenated contaminants are adsorbed along the mesopores of the material.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

In accordance with the present subject matter, an iron and palladium catalyst supported on a carbonaceous matrix can enhance the dechlorinating potential of lipophilic organo halogen compounds (OHC) through an equilibrium driven migration of OHC's towards the carbonaceous matrix and destroy them by an active iron-palladium phase. Such catalyst however requires a careful co-location of the active phase components (iron and palladium) on the matrix in such way to maximize the contact between the two metals, and ensure placement of clusters within the mesoporous structure of the matrix and minimize the use of palladium.

The present subject matter is applicable for the remediation of sediments and groundwater from persistent halogenated contaminants (PHCs). New and innovative methods of synthesis of catalyst material are described. The methods produce materials with interspersed iron and palladium (Fe and Pd) atoms in the same clusters distributed inside the mesopores of granulated activated carbon matrix. Moreover, the present subject matter provides a sustainable and effective approach to remediate PHCs in-situ and ex-situ without disturbing and/or contaminating the media such as for example sediments, sludge, and water.

Figure 1:
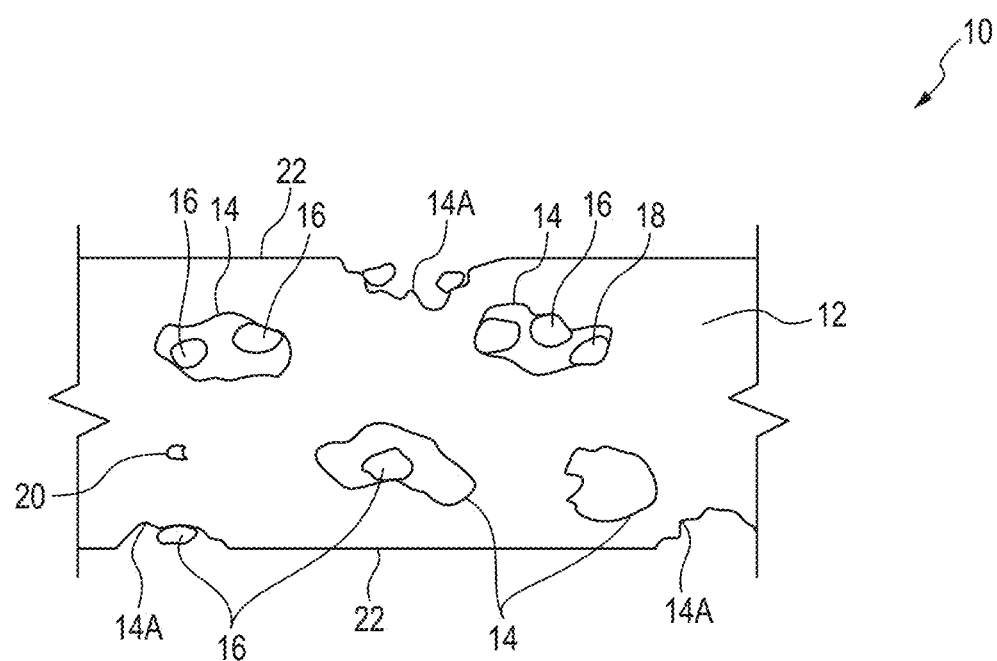
FIG. 1 is a schematic cross section illustrating an embodiment of a material in accordance with the present subject matter.

FIG. 1 schematically illustrates an embodiment of a catalyst material 10 for degrading organic halogen compounds (OHC's) and particularly chlorinated and/or fluorinated organic compounds. The material 10 comprises a carbonaceous matrix 12 having a plurality of mesopores 14 and 14A distributed throughout the matrix 12. The material 10 also comprises clusters 16 of iron (Fe) and palladium (Pd) atoms located in at least a portion of the mesopores 14 and 14A. The material 10 can also optionally comprise one or more agents 18 also located in the mesopores 14 and 14A, and/or additional non-carbonaceous agents 20 residing in the matrix 12.

The mesopores can be in the form of interior hollow regions or cavities such as depicted by mesopores 14, and/or in the form of depressions or recessed regions located along an exterior surface 22 of the material 10 such as depicted by mesopores 14A. Although the present subject matter includes a wide array of shapes and sizes for the mesopores 14, 14A, in many embodiments, the mesopores exhibit an average maximum span within a range of from about 0.1 microns to 100 microns, more particularly from 0.1 microns to 1 micron, and in certain versions from 1 micron to 100 microns. However, it will be understood that the present subject matter includes materials with mesopores exhibiting spans greater than and/or lesser than these noted spans.

In many embodiments, the carbonaceous matrix 12 includes activated carbon or like materials. A wide array of granular activated carbon (GAC) can be used. GAC is commercially available from numerous suppliers. It will be understood that the present subject matter is not limited to the use of activated carbon, and includes other materials or compositions that provide mesopores and suitable properties.

The term "cluster" as used herein is a small arrangement or agglomeration of atoms in the nanoscale size range. The preferred embodiment materials utilize clusters that include iron and palladium. Typically, the molar ratio of iron to palladium in the clusters is within a range of from about 500 to about 20, more particularly from 100 to 50. However, it will be understood that the present subject matter includes molar ratios of iron to palladium greater than and/or lesser than these noted ratios.

In certain embodiments, the materials utilize particular weight amounts of the iron and palladium based upon the amount of the carbonaceous matrix. Specifically, these embodiments include a total weight percentage of iron and palladium based upon the matrix of from about 10% to about 0.01%, more particularly from 8% to 0.05%, and in certain versions from 6% to 0.09%. However, it will be understood that the present subject matter includes the use of amounts of iron and palladium greater than and/or lesser than these noted amounts.

Figure 2:
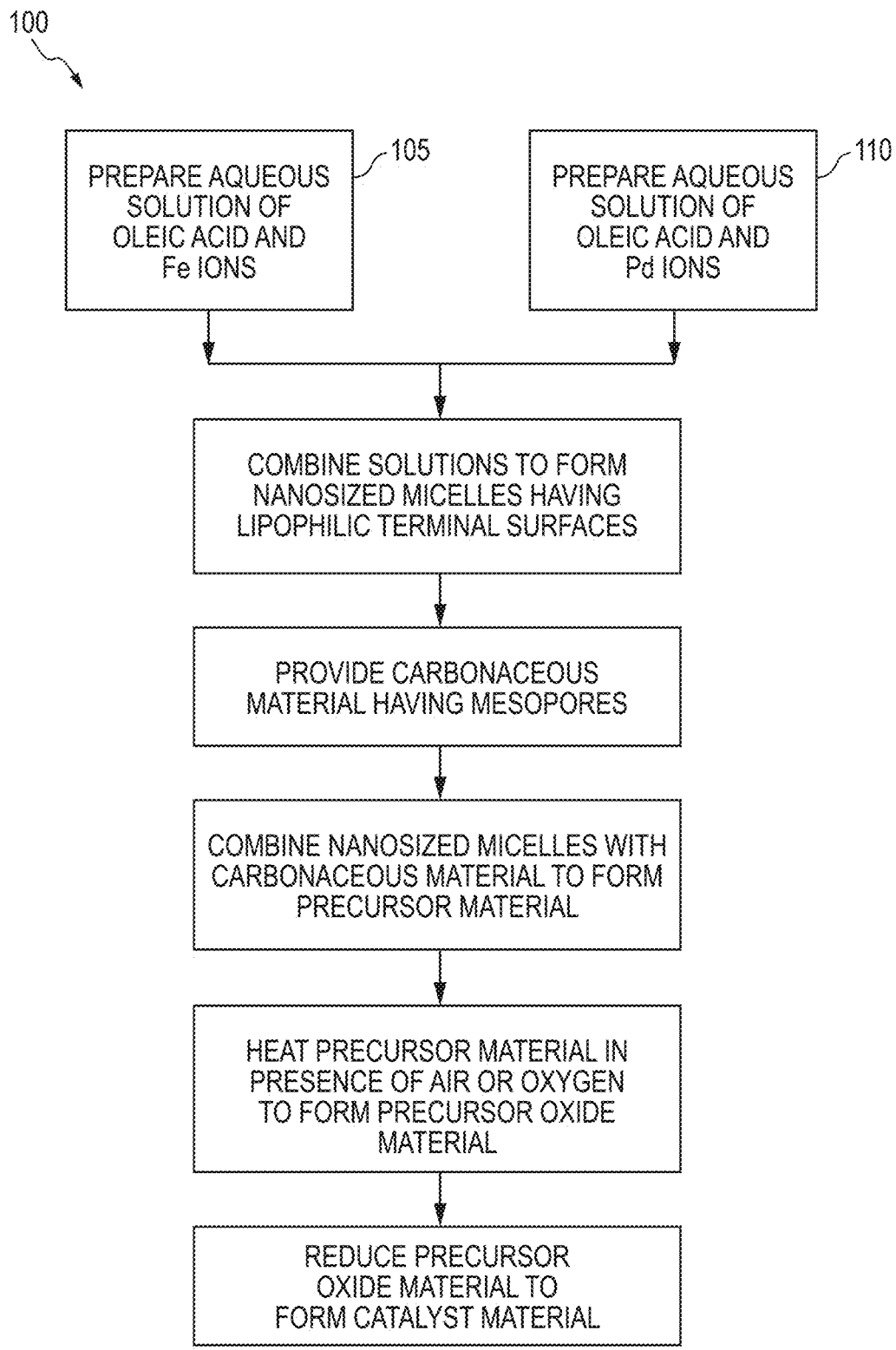
FIG. 2 is a schematic flow chart illustrating a method for producing the material in accordance with an embodiment of the present subject matter.

The present subject matter also provides methods of synthesizing the noted materials. FIG. 2 is a schematic flowchart illustrating a preferred method 100 for forming the catalyst material(s) such as for example the previously described material 10, of the present subject matter. The method 100 comprises one or more operations 105 of preparing an aqueous solution of oleic acid and iron ions. Typically, the solution includes oleic acid as a solvent. Typically, the solution includes iron ions in an amount of from about 2 mol/L to about 0.2 mol/L, more particularly from 1 mol/L to 0.25 mol/L, and in certain versions from 0.5 mol/L to 0.3 mol/L.

The method 100 also comprises one or more operations 110 of preparing an aqueous solution of oleic acid and palladium ions. Typically, oleic acid is a solvent matrix. Typically, the solution includes palladium ions in an amount of from 1 mol/L to about 0.01 mol/L, more particularly from 0.5 mol/to 0.01 mol/L, and in certain versions from 0.1 mol/L to 0.02 mol/L.

In operations 105 and 110, the solutions are prepared using oleic acid.

Although oleic acid has been found to be suitable, the present subject matter is not limited to such. For example, it is contemplated that other fatty acid(s) occurring naturally in various animal and vegetable fats and oils could potentially be used. Representative non-limiting examples of other fatty acids that could potentially be used include myristoleic acid, palmitoleic acid, sapienic acid, elaidic acid, vaccenic acid, linoleic acid, and erucic acid. It is also contemplated that other agent(s) in addition to, or instead of fatty acid(s) could be used.

The method 100 also comprises one or more operations 120 in which the solutions, i.e., the solution having iron ions and the solution having palladium ions, are combined to form nanosized micelles having lipophilic terminal surfaces. Typically, combining the noted solutions is performed by vigorous mixing for a time period of from about 1 minute up to 30 minutes or more. In many applications vigorous mixing for 5 minutes is satisfactory. After mixing the solutions, the resulting system is allowed to rest for a time period typically within a range of from several hours up to about a day or more. In many applications, a rest time period of 8 to 10 hours is satisfactory. Typically, the resulting system rests at room temperature, i.e., about 22° C. After sufficient rest, nanosized micelles having lipophilic terminal surfaces are formed.

The method 100 also comprises one or more operations 130 of obtaining a carbonaceous material having mesopores as described herein; and combining the micelles formed in operation(s) 120 with the carbonaceous material. Combining can be performed via one or more operations 140, but a convenient technique is to add hexane or similar organic liquid to the combined solutions after the noted resting period. The resulting system will form a layered system in which the micelles preferentially migrate to, and reside in, the hexane/organic layer. That layer is then added to the carbonaceous material. During and/or after such combining 140, the micelles migrate into the mesopores of the carbonaceous material, to thereby form precursor material. Typically, the combining operation(s) 140 is performed at room temperature.

The method 100 also comprises one or more operations 150 of heating the precursor material in the presence of air or oxygen to form precursor oxide material. A wide array of heating times and temperatures can be used. A multiple step heating process can be employed, for example a first heating operation at a temperature within a range of from 100° C. to 160° C., for a time period within a range of from 30 minutes to 3 hours followed by a second heating operation at a temperature within a range of from 300. However, it will be understood that the present subject matter is not limited to these heating profile(s). Instead, heating to nearly any temperature for a time sufficient to form precursor oxide material can be utilized.

The method 100 also comprises one or more operations 160 of reducing the precursor oxide material to form the catalyst material of the present subject matter. Typically, reduction is performed by heating the precursor oxide material in an oxygen-free, hydrogen environment. Nonlimiting examples of an oxygen-free, hydrogen environment include hydrogen gas and argon gas at a ratio of about 5% hydrogen and 95% argon. Typically, heating is performed at a temperature within a range of from about 200° C. to about 600° C., more particularly from 400° C. to 450° C., and more particularly at 430° C. Typically, such heating is performed for a time period within a range of from about 2 hours to about 10 hours, more particularly from 3 hours to 6 hours, and in certain versions for 4 hours. Again, it will be understood that the present subject matter is not limited to these particular heating profile(s). Instead, heating while in a reducing atmosphere for a time sufficient to form catalyst material can be used.

The present subject matter also provides a method for removing halogenated contaminants and particularly chlorinated and fluorinated organic compounds from an environment containing such. In this method, a catalyst material for example the previously described material 10, is exposed to an environment containing halogenated contaminants. In many applications, the halogenated contaminants are carried or contained in contaminated solid or particulate material such as soil, in contaminated liquids such as ground water, and/or in contaminated gases or vapors. The catalyst material can be exposed to flow streams of the contaminated solids, liquids, and/or gases or vapors. Halogenated contaminants are adsorbed along the mesopores and exterior surfaces of the catalyst material at which the clusters of iron and palladium degrade the halogenated contaminants and particularly chlorinated and fluorinated organic pollutants.

Specifically, the present subject matter provides an array of features and aspects including synthesis of catalyst on the carbonaceous materials; effectiveness of adsorbing and degrading chlorinated organic contaminants; and sustainability and environmental safety of the materials.

Several advantages of the present subject matter over prior art is that the iron and palladium catalyst is supported on the carbonaceous matrix; the iron and palladium catalyst is placed in the surface and mesopores of the carbonaceous materials; the system is very stable and does not introduce any hazardous chemicals into the environment; the carbonaceous materials can be applied in reactive cps and trenches; and the carbonaceous materials can be recovered, recycled and reused for multiple applications.

EXAMPLES

A new synthetic route was developed based on a reverse micelle method. To ensure excellent contact between the iron and palladium, both ions are encapsulated within a small nanosized sphere (micelle) that contains a water/oleic acid solution of both ions, with a lipophilic terminal surface. The lipophilic characteristics of the exterior of the water/oleic acid micelles results in their adherence to the walls of carbonaceous mesoporous materials. Another advantage of the micelle is that it forces the co-presence of both the palladium and iron ions in the same location. Introduction of the micelle solution (containing both Fe and Pd ions) onto carbonaceous mesoporous materials (e.g., GAC) results in an almost instantaneous migration of the micelles into the pores of the GAC (solution changed color from orange to clear in a few minutes). Centrifugation and decantation of the solvent served to remove the solvent for reuse, contributing to sustainable green chemistry. The micelle skeleton is comprised of naturally produced oleic acid, further emphasizing sustainability of this synthesis route. GAC containing Fe and Pd precursor is then subjected to calcination to burn off any remaining organic micelle skeleton, and convert Fe and Pd to corresponding oxides, then followed by a reduction process using hydrogen/argon at 420° C. for 2 h. This process allows for reduction of the oxides to ionic form and eliminates any remaining sodium borohydride reagent from the process.

Procedure to Prepare 95% Iron Oxide and 5% Palladium Oxide Particles Supported on GAC Dissolve 230 mg of $Fe(NO_3)_3 \cdot 9H_2O$ in 3 mL of DI water. Add 518 μL of oleic acid and stir vigorously in a vortex until all the Ferric ion is transferred to the micelle layer. Separately mix 3.6 mg of $Pd(NO_3)_2 \cdot xH_2O$ with 35 μL of oleic acid and stir vigorously in a vortex until all palladium nitrate is dissolved. Add Pd-micelle solution to Fe-micelle solution. Stir vigorously in a vortex for 5 min, then rest solution overnight (8-10 hrs). Add 3 mL of hexane and mix solution well. Add hexane layer prepared as above to 1 g of dried granular activated carbon (GAC). Dry the treated GAC in the oven at 120° C. for 1 h, then in a furnace at 430° C. for 4 h. Allow GAC to cool to room temperature.

The metal oxide nanoparticles supported on the GAC re then reduced using hydrogen gas (5% hydrogen and 95% argon). Place GAC to be reduced in a U-shaped tubular glass reactor, lower glass reactor inside a furnace equipped with temperature controls. Then pass hydrogen gas (5% hydrogen and 95% argon) through the reactor at a constant flow rate (5 $cm^3$/min). Increase temperature in a stepwise manner to 430° C. and hold at 430° C. for 4 h. Finally, stop hydrogen/argon gas flow, and remove reactor from the furnace. Collect the reduced GAC in a vial. Reduced GAC is then ready for use.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A method for preparing a material for degrading organo halogen compounds (OHC's), the method comprising:
   preparing an aqueous solution of oleic acid and iron ions;
   preparing an aqueous solution of oleic acid and palladium ions;
   combining the aqueous solution having iron ions with the aqueous solution having palladium ions and form nanosized micelles having lipophilic terminal surfaces;
   providing carbonaceous material having mesopores;
   combining the nanosized micelles with the carbonaceous material to form a precursor material;
   heating the precursor material in the presence of air or oxygen to form precursor oxide material;
   reducing the precursor oxide material to form the material for degrading OHC's;
   whereby after the combining of the solutions, the combined solutions are allowed to rest for a time period within a range of from 1 h to 24 h to form the nanosized micelles.

2. The method of claim 1 whereby the heating of the precursor material is performed at a temperature within a range of from 120° C. to 600° C.

3. The method of claim 1 whereby the reducing of the precursor oxide material is performed by heating the precursor oxide material in an oxygen-free, hydrogen environment.

4. The method of claim 3 whereby the heating is performed at a temperature within a range of from 200° C. to 600° C.

5. The method of claim 1 whereby the aqueous solution of oleic acid and iron ions includes iron ions in an amount of from 2 mol/L to 0.2 mol/L.

6. The method of claim 1 whereby the aqueous solution of oleic acid and palladium ions includes palladium ions in an amount of from 1 mol/L to 0.01 mol/L.

7. The method of claim 1 whereby the combining the aqueous solution having iron ions with the aqueous solution having palladium ions includes mixing for a time period of from 1 minute to 30 minutes.

8. The method of claim 1 whereby the heating the precursor material in the presence of air or oxygen to form the precursor oxide material is a multiple step heating process.

9. The method of claim 8 whereby the multiple step heating process includes a first heating operation at a temperature within a range of from 100° C. to 160° C. for a time period within a range of from 30 minutes to 3 hours.

10. The method of claim 1 whereby the mesopores of the carbonaceous material exhibit an average maximum span within a range of from 0.1 microns to 100 microns.

\* \* \* \* \*